(12) United States Patent
Tiana et al.

(10) Patent No.: US 10,681,316 B1
(45) Date of Patent: Jun. 9, 2020

(54) PASSIVE HEAD WORN DISPLAY

(71) Applicant: Rockwell Collins, Inc., Cedar Rapids, IA (US)

(72) Inventors: Carlo L. Tiana, Portland, OR (US); Robert D. Brown, Lake Oswego, OR (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 164 days.

(21) Appl. No.: 15/238,481

(22) Filed: Aug. 16, 2016

(51) Int. Cl.
 *H04N 9/31* (2006.01)
 *G02B 27/00* (2006.01)
 *G02B 27/01* (2006.01)

(52) U.S. Cl.
 CPC ....... *H04N 9/3179* (2013.01); *G02B 27/0093* (2013.01); *G02B 27/0172* (2013.01); *H04N 9/312* (2013.01); *H04N 9/3147* (2013.01); *H04N 9/3194* (2013.01); *G02B 2027/011* (2013.01); *G02B 2027/014* (2013.01); *G02B 2027/0138* (2013.01)

(58) Field of Classification Search
 CPC .... H04N 9/3179; H04N 9/312; H04N 9/3147; H04N 9/3194; G02B 27/0093; G02B 27/0172; G02B 2027/011; G02B 2027/0138; G02B 2027/014
 See application file for complete search history.

(56) References Cited

U.S. PATENT DOCUMENTS

| | | |
|---|---|---|
| 8,659,826 B1 | 2/2014 | Brown et al. |
| 8,847,919 B2 | 9/2014 | Krah |
| 9,274,339 B1 | 3/2016 | Brown et al. |
| 2006/0132914 A1* | 6/2006 | Weiss ................ G02B 5/32 359/462 |
| 2008/0002262 A1* | 1/2008 | Chirieleison ...... G02B 27/0093 359/630 |
| 2014/0268360 A1* | 9/2014 | Ellsworth ............ G02B 27/017 359/632 |
| 2017/0195647 A1* | 7/2017 | Honkanen ............ H04N 9/3185 |
| 2017/0228996 A1* | 8/2017 | Theytaz ............ G08B 21/0453 |
| 2017/0242253 A1* | 8/2017 | Benesh ............. G02B 27/0172 |

OTHER PUBLICATIONS

Marc Beuret et al., Design of an off-axis see-through display based on a dynamic phase correction approach, Optics Express, Sep. 26, 2011, 14 pages, vol. 19, No. 20, Optical Society of America.

* cited by examiner

*Primary Examiner* — Michael E Teitelbaum
(74) *Attorney, Agent, or Firm* — Suiter Swantz pc llo (57) ABSTRACT

A system for presentation of visual information to a user includes an image generator operatively coupled to an information source, a projector operatively coupled to the image generator and configured to project light indicative of the image within a defined region of space comprising a head box, a head worn viewing device comprising an optical element configured to receive the light indicative of the image when the optical element is positioned in the head box and to convert the light indicative of the image into a final image viewable by the user.

9 Claims, 12 Drawing Sheets

PASSIVE HEAD WORN DISPLAY

BACKGROUND

The inventive concepts disclosed herein relate generally to displays and display methods, and more particularly, embodiments of the present invention relate to a worn display, such as a head worn display (HWD).

Display systems are used to provide information to users for various applications. In aircraft applications, displays can provide precision guidance information to a pilot. For example, head-up displays (HUDs) superimpose images from two sources, the outside world and a second source for presentation to the pilot. Head-up displays are especially useful in aircraft because they allow the pilot to view information related to flight parameters without diverting attention from the view of the outside world through the windshield. Conventional head-up displays require optical components that can be heavy, expensive, and take up space in the cockpit.

Head worn displays have similarly been used in aircraft applications to allow a pilot to view precision guidance information without diverting attention from the real world scene. One type of head worn display is a helmet mounted display in which optical components are mounted to the operator's helmet. Helmet mounted displays have primarily been used in military applications.

Head worn displays often must maintain boresight accuracy when displaying precision guidance information. To achieve boresight accuracy, the head worn display requires a tracking sensor that determines the position of the head worn components of the head worn display with respect to the boresight so that the differences in positions can be accommodated. For example, head worn displays including helmet-mounted displays used in the cockpit of an aircraft often require head tracking to determine the orientation of head worn portion of the display so that the displayed material can be offset to produce conformal alignment with the real world scene.

Commercial aircraft pilots do not wear helmets while piloting aircraft, and therefore need a head worn display that is not helmet mounted. Commercial pilots commonly wear eye protecting sunglasses, since most day flying conditions are above the clouds and the intensity of sunlight at those altitudes is high. A head worn display that is similar in size, shape and weight to sunglasses would be desirable.

The sunglasses that individuals including commercial pilots wear are personal property, and are seldom shared with or worn by others. A head worn display to be used by pilots while piloting an aircraft would also preferably not be shared or worn by others, and would be treated as personal property for reasons of hygiene, confirmation of availability, and confidence of functionality.

For a head worn display to be regarded and possibly even purchased by pilots as personal property, the cost of the device must be low, and the operational life of the device must be long to justify the investment.

SUMMARY

In one aspect, the inventive concepts disclosed herein are directed to a device for presentation of visual information to a user. The device includes an image generator operatively coupled to an information source and configured to generate at least one image. At least one projector is operatively coupled to the image generator and is configured to generate light indicative of the at least one image and project the light indicative of the at least one image within a defined head box region such that a head worn viewing device positioned in the head box region receives and converts the light indicative of the at least one image into a final image viewable by the user, the final image being different from the at least one image.

In a further aspect, the inventive concepts disclosed herein are directed to a system for presentation of visual information to a user in an aircraft. The system includes an image generator operatively coupled to an information source and configured to generate at least one image. At least one projector is operatively coupled to the image generator and is configured to project light indicative of the at least one image within a defined region of space comprising a head box. A head worn viewing device has an optical element configured to receive the light indicative of the at least one image when the optical element is positioned in the head box. The optical element is configured to convert the light indicative of the at least one image into a final image viewable by the user, the final image being different from the at least one image.

In a still further aspect, the inventive concepts disclosed herein are directed to a method for presentation of visual information to a user. The method may include receiving information to be displayed to a user in an environment from an information source. The method may further include generating symbols for display to the user in response to information received from the information source. The method may further include determining the position and orientation of a head worn optical combiner, and changing one or more characteristics of a modulated light beam based on the position and orientation of the head worn optical combiner. The method may further include projecting the modulated light beam toward the head worn optical combiner, and receiving the modulated light beam and converting it to an overlaid virtual image viewed simultaneously with the outside world view through the head worn optical combiner.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for employing a quantum dot nano crystal layer within a display assembly for increased spectrum conversion from a broad spectrum of UV energy to a visual wavelength. However, skilled artisans will recognize additional spectrum conversion techniques function within the scope of the inventive concepts disclosed herein.

Figure 1:
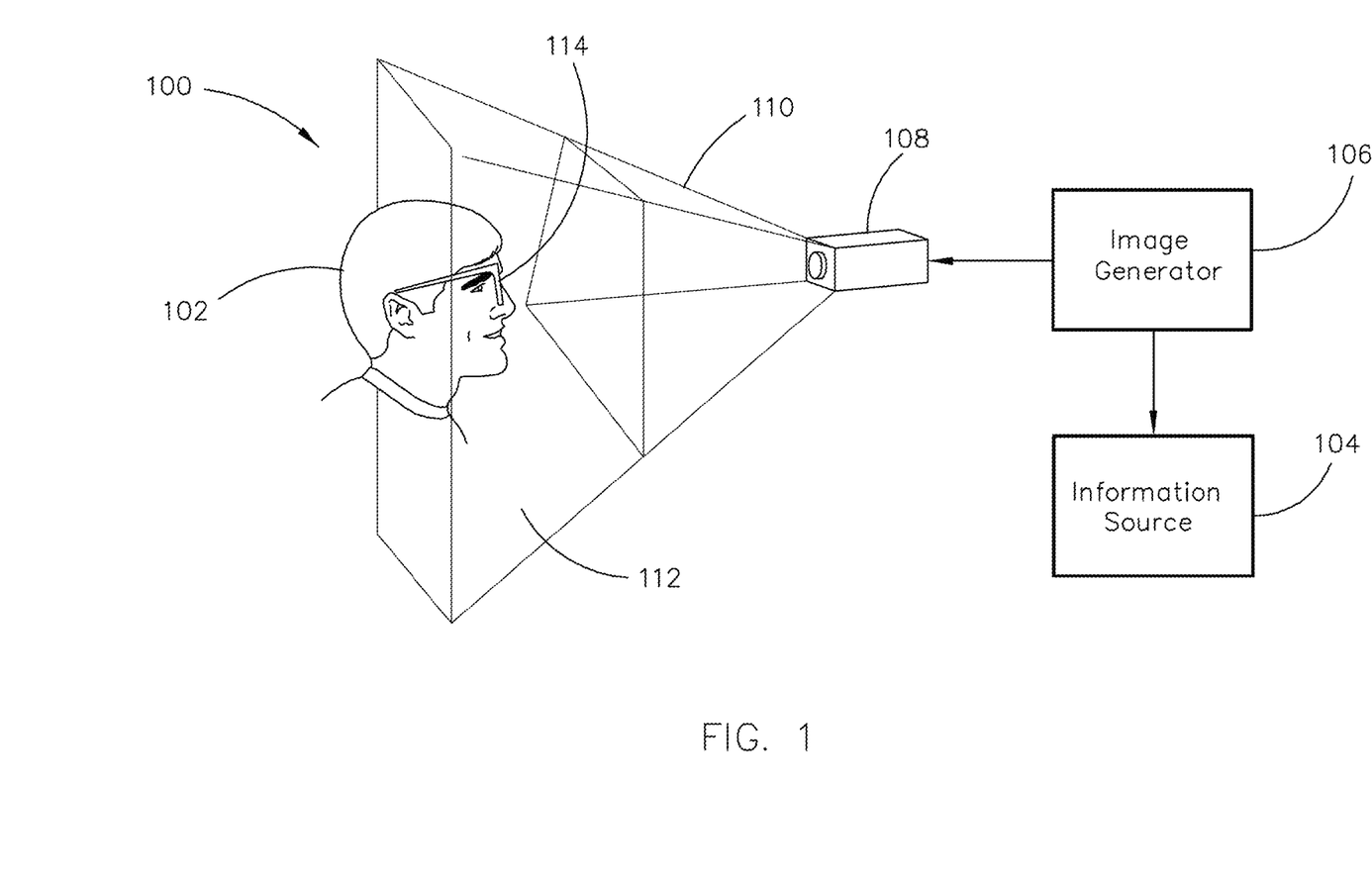
FIG. 1 is a perspective view of an exemplary embodiment of a free-space projected information viewing system for providing visual information to an individual user according to the inventive concepts disclosed herein.

Referring now to FIG. 1, an embodiment of a projected information viewing system 100 is configured to present visual information to a user 102 according to the inventive concepts disclosed herein. An information source 104 is operatively coupled to an image generator 106 that may receive information and generate visual symbols from the information. The visual symbols may include one or more of: textual characters, lines, polygonal shapes, curved shapes, or images. Each of the visual symbols may be generated in one or more colors. The image generator 106 may convert the visual symbols into a form suitable for projecting in free space toward the optical combiner 114. The projector 108 may project modulated light beams 110 containing the visual symbols using one or more of: a digital light panel modulator optically coupled with a monochrome or color light source, a liquid crystal modulator optically coupled with a monochrome or color light source, and one or more lasers optically coupled through a laser steering component.

The modulated light beams 110 projected by the projector 108 are directed toward the user 102, and may be visible by the user 102 within an operational volume or head box 112. The user 102 has a head worn optical combiner 108 that may be placed in near proximity of one or both eyes. The optical combiner 108 may receive the modulated light beams 110 and convert them into a virtual image that is directly viewable by the user 102. The optical combiner 108 may be generally transparent, making it possible for the user 102 to see through the optical combiner 108 while simultaneously viewing the virtual image of the visual symbols created by the image generator 106 and the projector 108.

Figure 2:
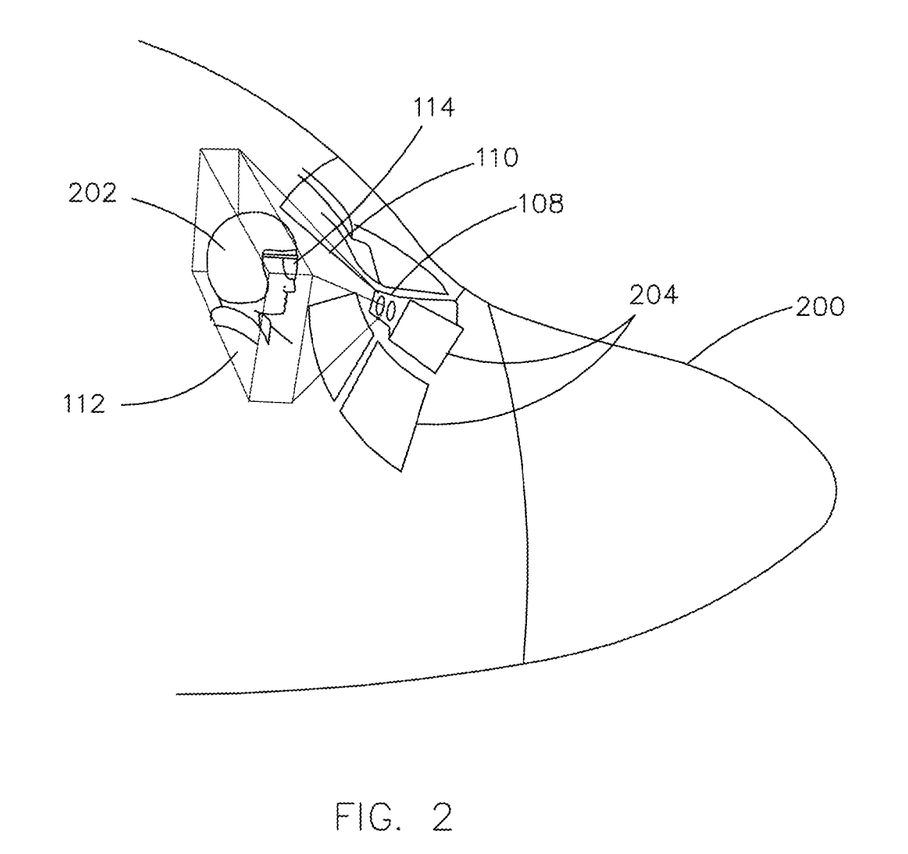
FIG. 2 is side view of an exemplary embodiment of the projected information viewing system of FIG. 1 in an aircraft flight deck environment according to the inventive concepts disclosed herein.

Referring now to FIG. 2, an exemplary embodiment of a projected information viewing system in an aircraft flight deck environment 200 is configured to present visual information to a pilot 202 flying the aircraft according to the inventive concepts disclosed herein. The projector 108 of FIG. 1 may be mounted to the aircraft and may be configured with most of the components of the projector 108 positioned behind or within a flight deck panel containing flight instruments or displays 204. The projector 108 may project modulated light beams 110 toward the optical combiner 108 so that the pilot 202 may simultaneously view virtual images of the visual symbols created by the image generator 106 as well as the outside world viewed from the flight deck environment 200.

Figure 3:
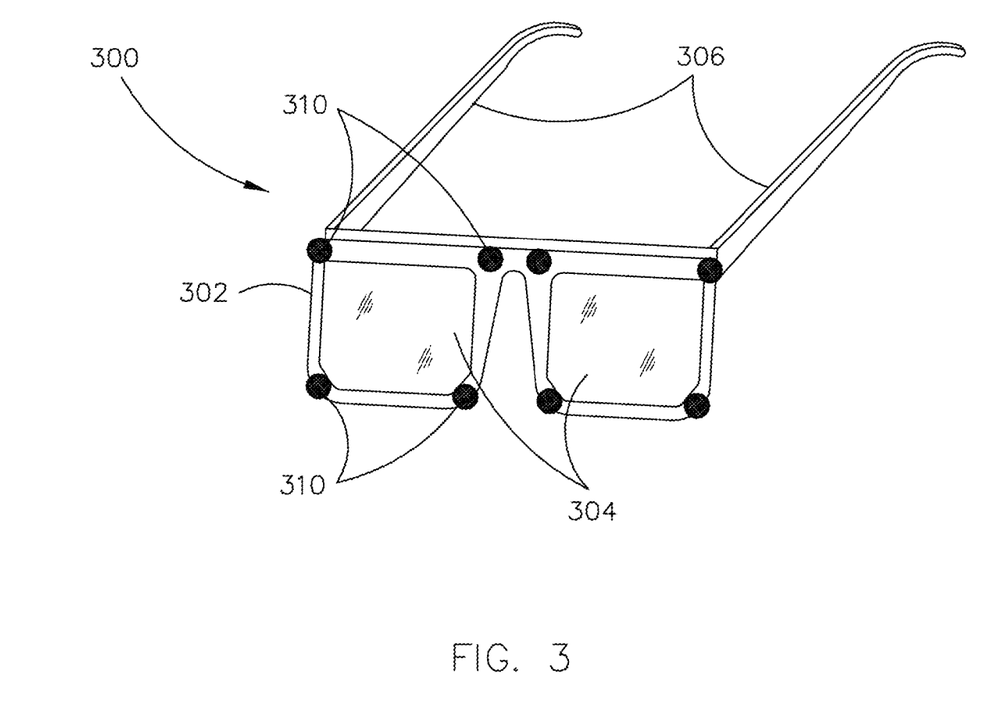
FIG. 3 is a front view of an exemplary embodiment of a head worn optical combiner according to the inventive concepts disclosed herein.

Referring now to FIG. 3, an exemplary embodiment of a head worn optical combiner assembly 300 according to the inventive concepts disclosed herein is shown. The optical combiner assembly 300 may be similar in size and shape to ordinary eye glasses or sun glasses. In an embodiment, the optical combiner assembly 300 may include a frame 302, earpieces 306, and an optical combining element 304 supported by the frame 302. The optical combining element 304 is transparent to allow the user to see through the combiner assembly 300 to make it possible to view the surrounding environment. The optical combining element 304 may further have an optical property of receiving a modulated spatial area of light such modulated light beams 110 from an external projector and operating on that modulated light so that it may be viewed as a virtual image by a person who is wearing the head worn optical combiner assembly 300.

The head worn optical combiner assembly 300 may be configured with electronic components packaged within a portion of the frame 302. The electronic components may include but are not limited to: one or more magnetic head tracking sensors, one or more inertial sensors, one or more optical emitters, one or more digital cameras, a wireless transmitter or transceiver, a computing component, and a power source such as a battery.

The head worn optical combiner assembly 300 may further be configured with multiple markers 310 located on the frame 302. The markers 310 may include one or more of: a passive contrasting colored material that can be optically sensed by a digital camera, a passive retro-reflecting material that has the property of reflecting incident light directly back toward the point from which the incident light originates, or an active light emitting device such as a light emitting diode (LED). The markers 310 may be sensed by an external digital camera to determine a position and orientation of the head worn optical combiner assembly 300 with respect to the projector 108. The markers 310 may contain computer readable codes, may preferentially reflect certain wavelengths, or contain other features that allow discrimination among individual markers.

Figure 4:
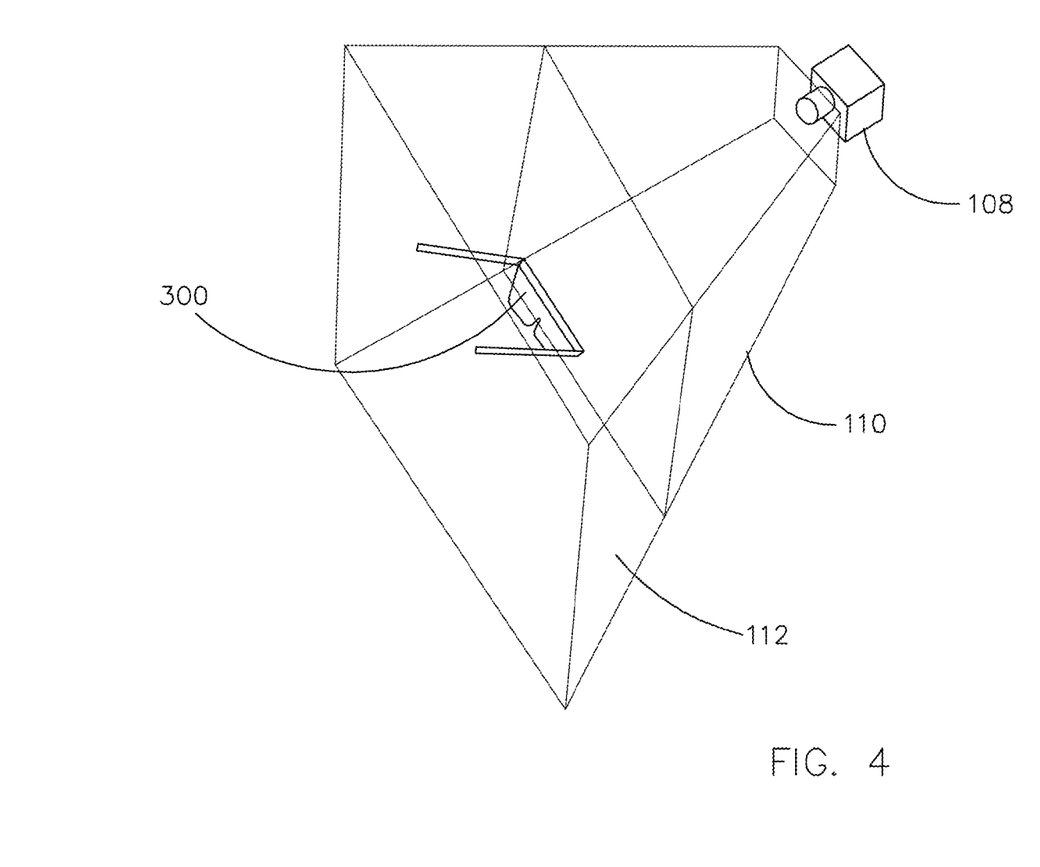
FIG. 4 is a perspective view of an exemplary embodiment of the head worn optical combiner of FIG. 3 positioned within the operational volume of the projected information viewing system according to the inventive concepts disclosed herein.

Referring now to FIG. 4, a perspective view of an exemplary embodiment of the projected information viewing system to present visual information to a user according to the inventive concepts disclosed herein is shown. The head worn optical combiner assembly 300 may receive modulated light beams 110 from an external projector 108 and may operate on that modulated light so that it may be viewed as a virtual image by a person who is wearing the head worn optical combiner assembly 300. The spatial volume within which the virtual image is clearly viewable by the user is the head box 112, which may have a known and/or fixed height, width and depth.

Figure 5:
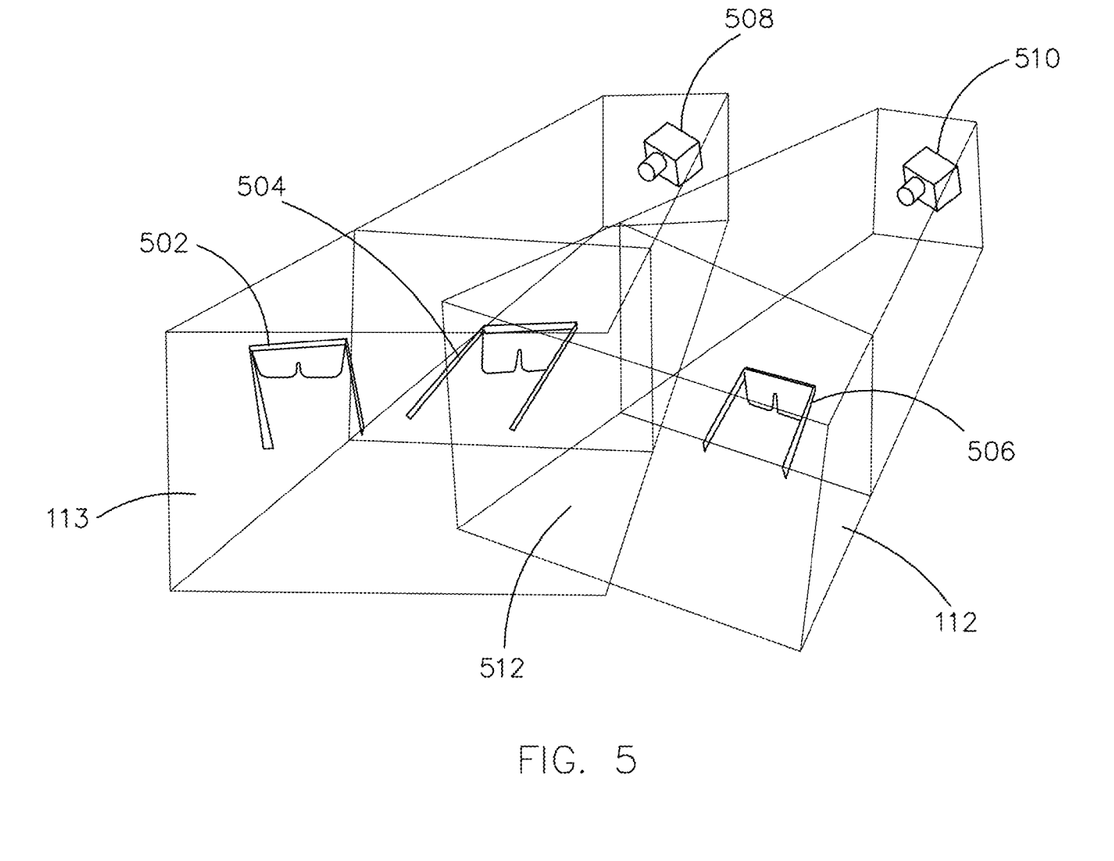
FIG. 5 is a perspective view of an exemplary embodiment of several possible locations and orientations of the head worn optical combiner of FIG. 3 positioned within an expanded operational volume of the projected information viewing system according to the inventive concepts disclosed herein.

Referring now to FIG. 5, a perspective view of an exemplary embodiment of the projected information viewing system to present visual information to a user according to the inventive concepts disclosed herein is shown. In FIG. 5, two head box regions 112 and 113 are provided by utilizing two projectors 510 and 508 respectively. The head box regions 112 and 113 overlap in a region 512. If the head worn optical combiner assembly 300 is in a location 502, the projector 508 provides modulated light beams to be viewed as a virtual image. If the head worn optical combiner assembly 300 is in a location 506, the projector 510 provides modulated light beams to be viewed as a virtual image. If the head worn optical combiner assembly 300 is in a location 504, either the projector 508 or the projector 510 may provide modulated light beams to be viewed as a virtual image, with one projector being active to avoid presenting double images that may result in degraded quality of the viewed image. The projector that is not active may be switched on at any time that the head worn optical combiner assembly 300 is in location 504, and the projector that is active may be switched off at the same time so that the visual information may be provided to the user without interruption.

Figure 6:
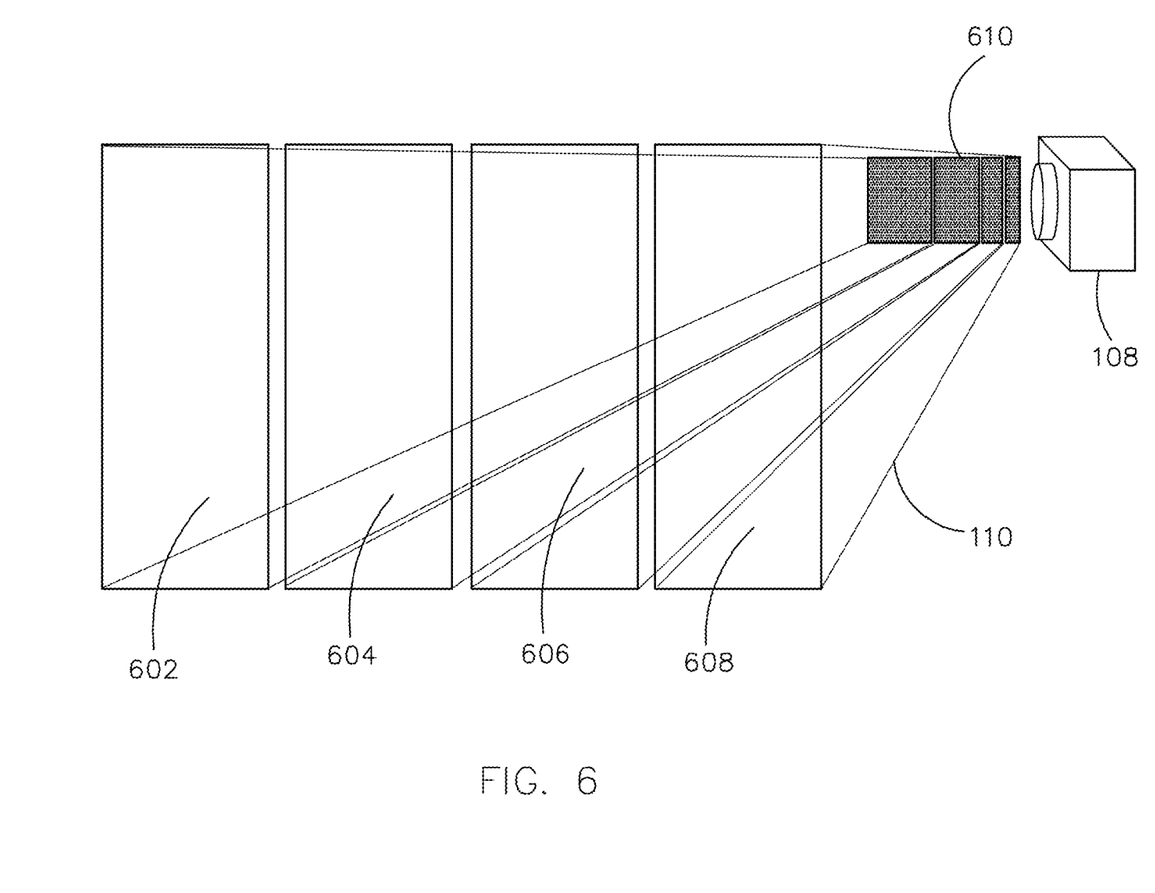
FIG. 6 is a perspective view of an exemplary embodiment of an expanded operational volume of the projected information viewing system using a single projector with an optical steering element according to the inventive concepts disclosed herein.

Referring now to FIG. 6, a perspective view of an exemplary embodiment of the projected information viewing system to present visual information to a user according to the inventive concepts disclosed herein is shown. In FIG. 6, four head box regions 602, 604, 606 and 608 are provided by utilizing a single projector 108 coupled with a selectable reflector 610. The selectable reflector 610 may reflect modulated light beams 110 containing visual symbols in two or more directions determined by a controller. The selectable reflector 610 may be controlled to move the spatial direction of the modulated light beams 110 horizontally as shown in FIG. 6; it may be controlled to move the spatial direction of the modulated light beams 110 vertically; or it may be controlled to simultaneously move the spatial direction of the modulated light beams 110 both horizontally and vertically. The modulated light beams 110 containing visual symbols may be directed to one or more predetermined head box regions such as 602, 604, 606 and 608. A camera processor 704 may provide distortion and perspective corrections to the information in the modulated light beams 110 to maintain accurate conformal projection onto the outside world.

Figure 7:
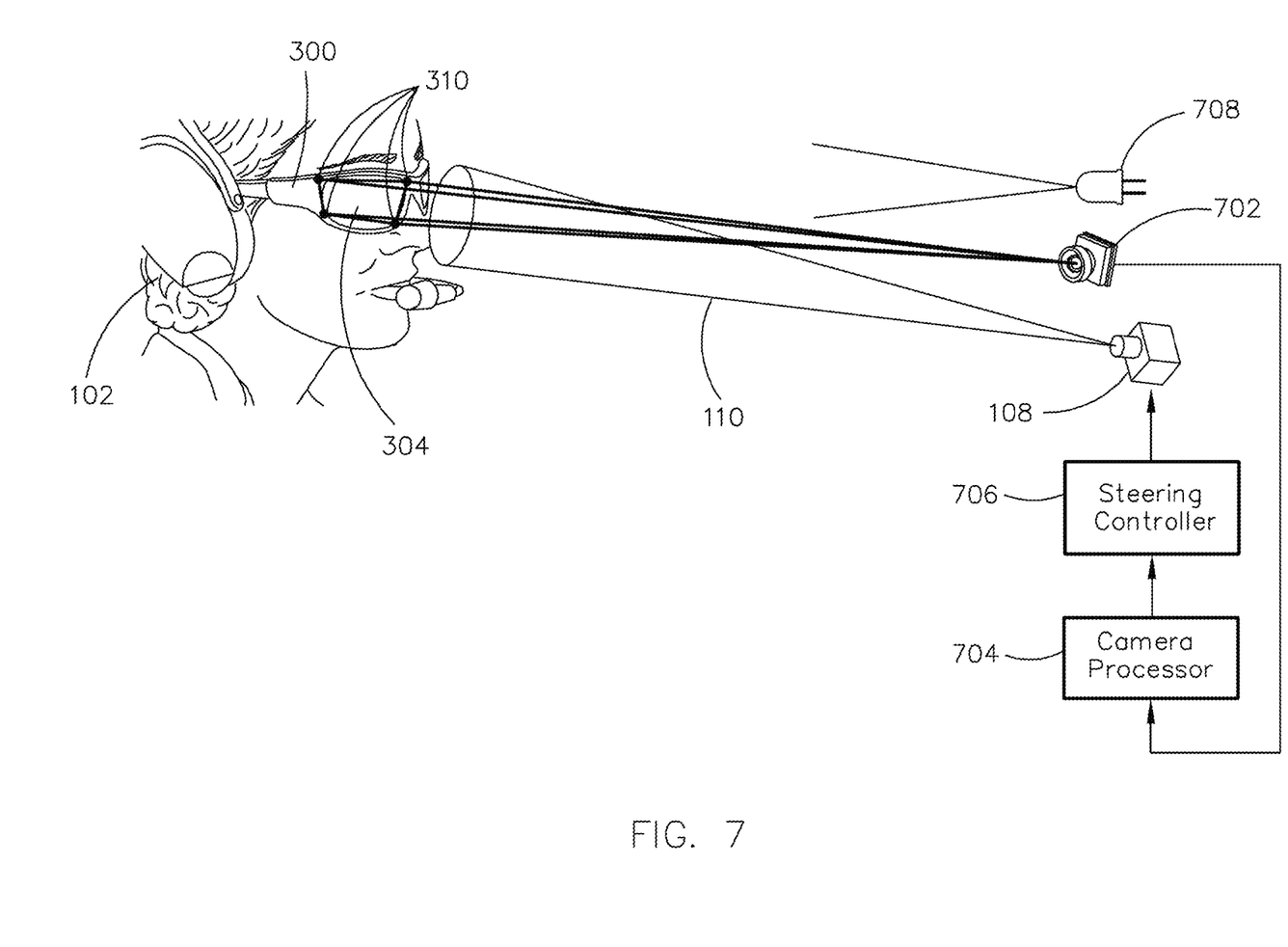
FIG. 7 is a side view of an exemplary embodiment of a free space information viewing system with a steered projected light beam and a camera to determine the location of the optical combiner according to the inventive concepts disclosed herein.

Referring now to FIG. 7, a side view of an exemplary embodiment of a free space information viewing system with a steered projected light source and a camera to determine the location of the optical combiner according to the inventive concepts disclosed herein is shown. The user 102 may wear a head worn optical combiner assembly 300. The location of the head worn optical combiner assembly 300 within the region of the head box 112 may be determined by configuring a camera 702 to capture images of two or more optical markers 310. An illuminator 708 may provide light to illuminate the optical markers 310 so they may be visible to camera 702. The camera 702 may be operatively coupled to the camera processor 704, and images of the two or more optical markers 310 indicating the location of the optical element 304 may be received by the camera processor 704. A steering controller 706 may be operatively coupled to the camera processor 704 and may use the optical marker 310 position information from the camera processor 704 to control the projector 108 to steer the modulated light beams 110 containing visual symbols.

Figure 8A:
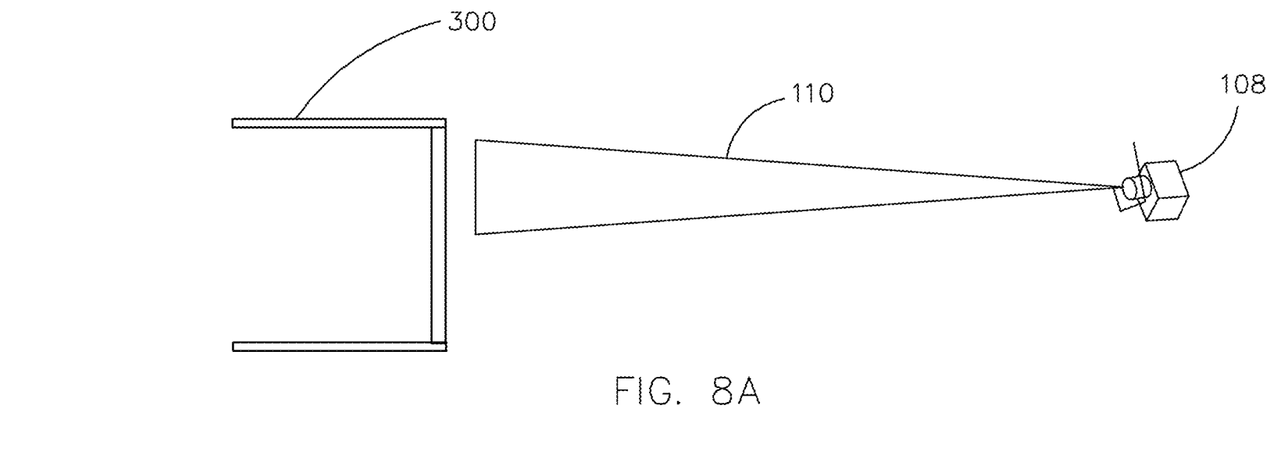
FIGS. 8A and B are top views of an optical collimating combiner for receiving the projected light source at varying incident angles and converting it to a viewable image according to the inventive concepts disclosed herein.
Figure 8B:
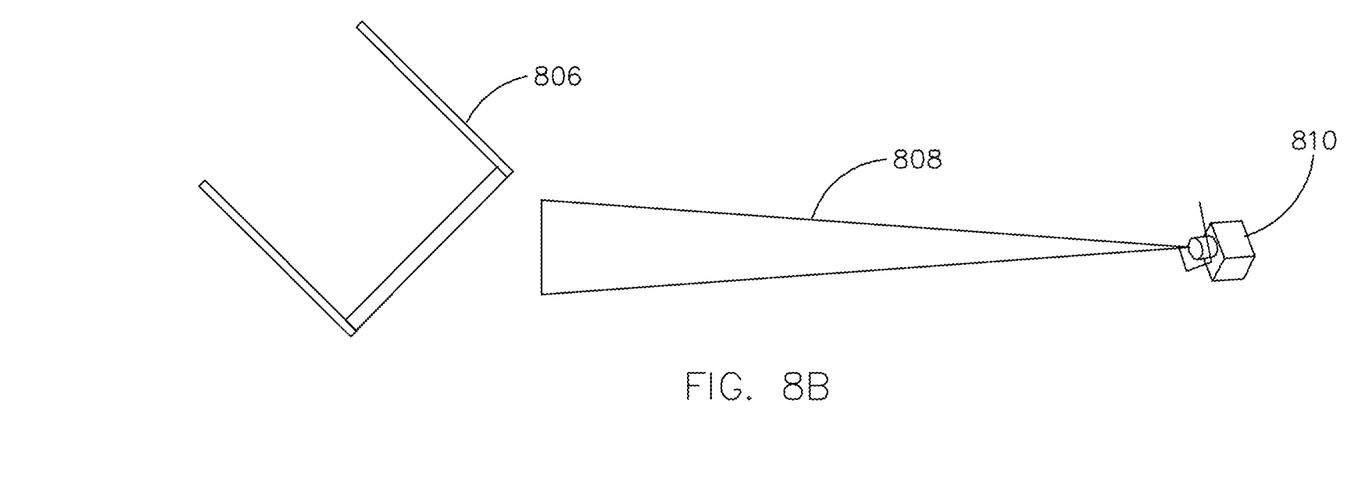

Referring now to FIG. 8, a top view an exemplary embodiment of an optical collimating combiner for receiving the projected light source at varying incident angles and converting it to a viewable image according to the inventive concepts disclosed herein is shown. In a first instance, the projector 108 may project modulated light beams 110 containing visual symbols toward a head worn optical combiner assembly 300, where the optical combiner assembly 300 directly faces projector 108. The visual symbols may be generated by the image generator 106 of FIG. 1 using information from the information source 104 of FIG. 1. In a second instance, a projector 810 may project modulated light beams 808 containing visual symbols toward a head worn optical combiner assembly 806, where the optical combiner assembly 806 is turned at a 45 degree angle away from the projector 810. In the second instance, the image generator 106 of FIG. 1 may change one or more characteristics of the modulated light beams 808, including horizontal scaling, vertical scaling, trapezoidal or keystone correction, barrel distortion, cushion distortion, or other types of optical distortion, such that the image viewed by the user may appear the same when viewed at an angle as it appears in the directly facing instance. It is to be understood that the optical combiner assembly 806 may be angled at any desired angle with respect to the projector 808.

Figure 9:
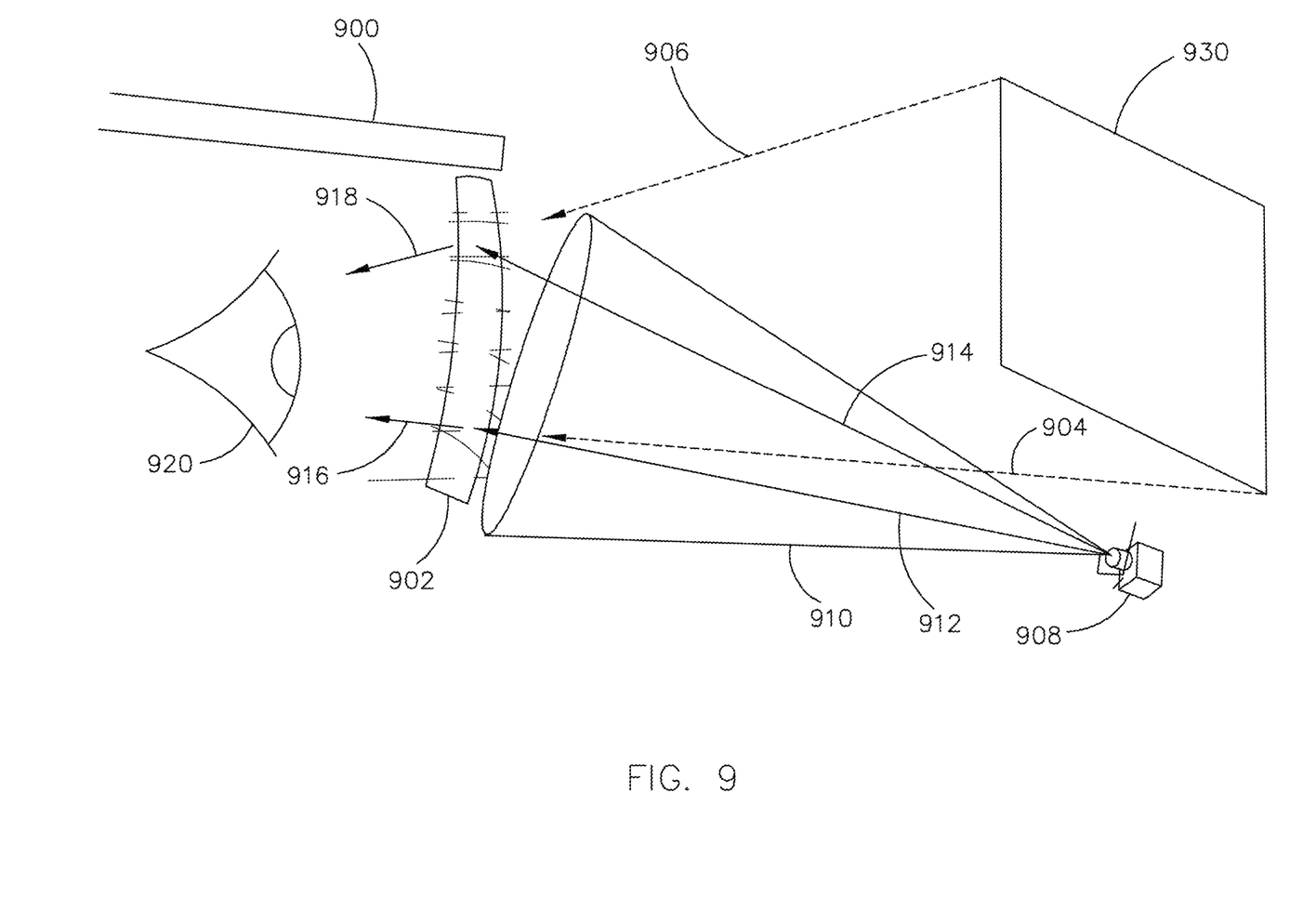
FIG. 9 is a side view of an exemplary embodiment of an optical collimating combiner for receiving the projected light source and converting it to a viewable image according to the inventive concepts disclosed herein.

Referring now to FIG. 9, an exemplary embodiment is shown of a holographic combiner for receiving the projected light source and converting it to a viewable image according to the inventive concepts disclosed herein. The user may wear a head worn optical combiner assembly 900 configured with a see-through holographic combiner 902. A projector 908 may be configured with a spatial light modulator to project a holographic modulated light beams 912 that are indicative of a virtual image of visual symbols to be viewed by the user. The holographic combiner 902 may be configured to receive and transform the holographic modulated light beams 912 into an image that may be viewed by the user as a virtual image 930. A light ray 912 emitted by the projector 908 may be received and transformed by the holographic combiner 902, and may continue as a light ray 916 toward the eye of the user 920. A light ray 916 may appear to the user as if it had been received as a virtual light ray 904 from the corner of a virtual image 930. Similarly, a light ray 914 emitted by the projector 908 may be received and transformed by the holographic combiner 902, and may be continue as a light ray 918 toward the eye of the user 920. The light ray 918 may appear to the user as if it had been received as a virtual light ray 906 from the opposite corner of the virtual image 930.

Figure 10A:
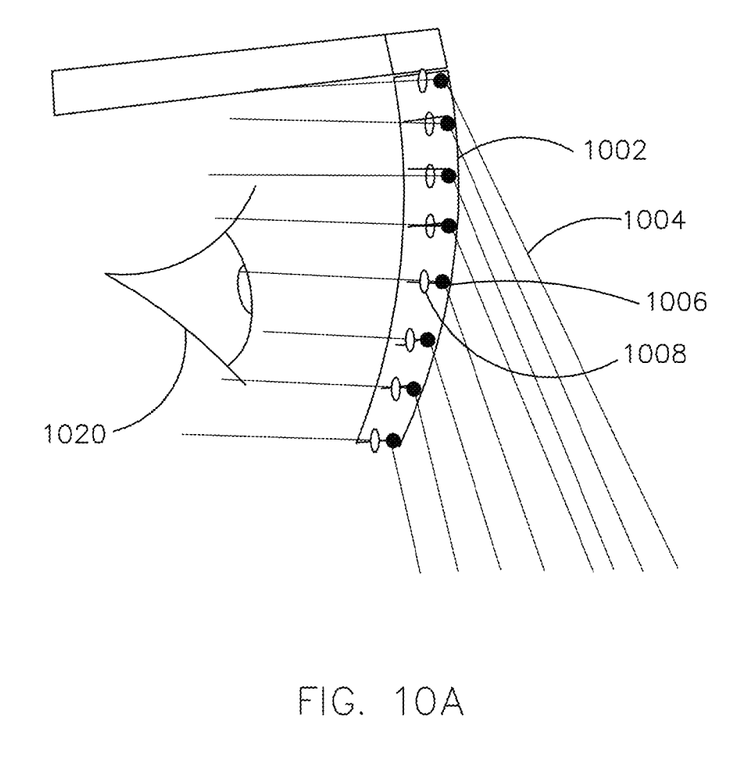
FIGS. 10A and 10B are side views of an exemplary embodiment of an emissive combiner for receiving the projected light source and converting it to a viewable image according to the inventive concepts disclosed herein.
Figure 10B:
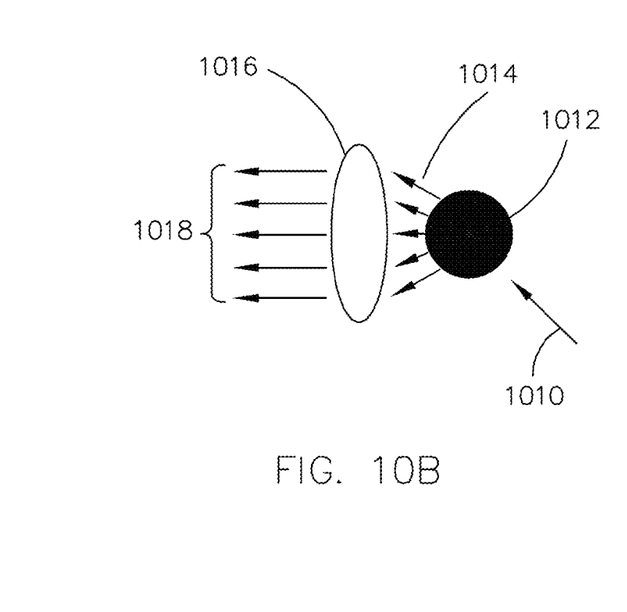

Referring now to FIG. 10, an exemplary embodiment of an emissive combiner 1002 for receiving the projected light source and converting it to a viewable image according to the inventive concepts disclosed herein is shown. The emissive combiner 1002 is a see-through optical element with a plurality of embedded particles that may fluoresce and emit visible light when illuminated by an appropriate pumping source. The emissive combiner 1002 may be similar in size to an eye glass lens that is placed in near proximity to the user's eye 1020. Illuminating or pumping light 1004 may be ultraviolet, violet, blue or other wavelength with sufficient energy to cause embedded fluorescent or phosphorescent particles 1006 to emit visible light. Particles 1006 may function as point light emitters, and may radiate light in divergent directions. A lens element 1008 may be located with the light emitting particles to cause the light to be emitted in collimated fashion.

For purposes of more clear illustration, a magnified view of a single embedded fluorescent or phosphorescent particle 1012 is shown. Pumping or illuminating light 1010 may be directed toward the particle 1012 at an incident angle not necessarily straight on to the particle 1012. The particle 1012 is pumped by the incident illuminating light 1010 and emits light 1014 at a wavelength different from the incident light. In an exemplary embodiment, the illuminating light may be in one of ultraviolet, violet or blue wavelength, and the emitted light may be of green wavelength. The emitted light may scatter in divergent directions and may be refracted by lens element 1016, causing the emitted light 1018 to exit toward the eye of the user in collimated fashion.

Figure 11:
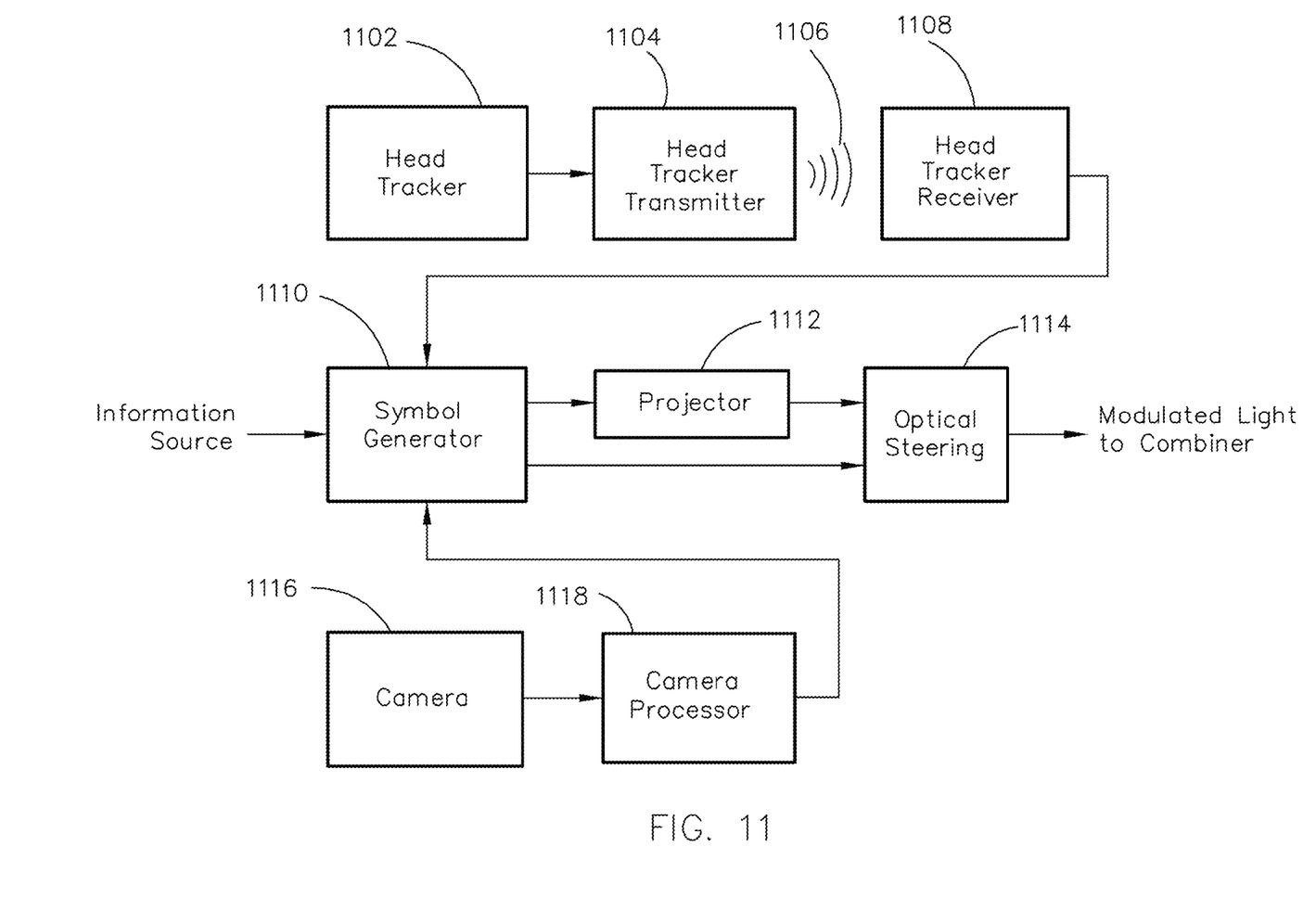
FIG. 11 is a block diagram of an exemplary embodiment of an image generator and projector control system for providing visual information to an individual user according to the inventive concepts disclosed herein.

Referring now to FIG. 11, a block diagram of an exemplary embodiment of an image generator and projector control system for providing visual information to an individual user according to the inventive concepts disclosed herein is shown. This block diagram assumes the head of the user 102 is within the head box region 112 within which the combiner 300 is able to receive the modulated light beams 110 containing visual symbols. A head tracker assembly 1102 may be located on or within the head worn optical combiner assembly 300, and may be either completely self-contained, or it may include one or more external non-head worn components such as a controller, a magnetic field source, one or more external cameras, one or more external optical markers, or one or more light sources. A head tracker transmitter 1104 may be operatively coupled to the head tracker assembly 1102, and may transmit a determined position and orientation of the head using either a wired or wireless communication link 1106 to head tracker receiver 1108. If the head tracker communication link 1106 is wireless, the head tracker assembly 1102 and the head tracker transmitter 1104 may be powered by a battery.

A camera 1116 may be located with the projector 1112, and may be oriented so that it has a view of the head box region 112. The camera 1116 may be operatively coupled with a camera processor 1118, which may receive video images from the camera 1116. The video images may include a view of the head worn optical combiner assembly 300, markers 310, and optical combining element 304. The camera processor 118 may identify the markers 310 within the camera image, and may determine the spatial location and orientation of the markers 310 and the location and orientation of the optical combining element 304. The markers 310 may contain features that allow individual identification.

The symbol generator 1110 may be configured to receive information from an information source such as one or more sensors, processors or controllers in an aircraft, vehicle, observation or control environment. The symbol generator 1110 may generate symbols for display to the user in response to information received from the information source. The symbol generator 1110 may be operatively coupled with a head tracking subsystem, a camera subsystem, or both to determine where to steer the modulated light beams 110 containing visual symbols, and to change one or more characteristics of the modulated light beam, including horizontal scaling, vertical scaling, trapezoidal or keystone correction, barrel distortion, cushion distortion, or other types of optical distortion. The symbol generator 1110 may be operatively coupled to the projector 1112, which modulates the light with the visual symbols generated by the symbol generator 1110. An optical steering assembly 1114 may be operatively coupled with the symbol generator 1110 to steer the modulated light beams 110 to the optical combining element 304.

Figure 12:
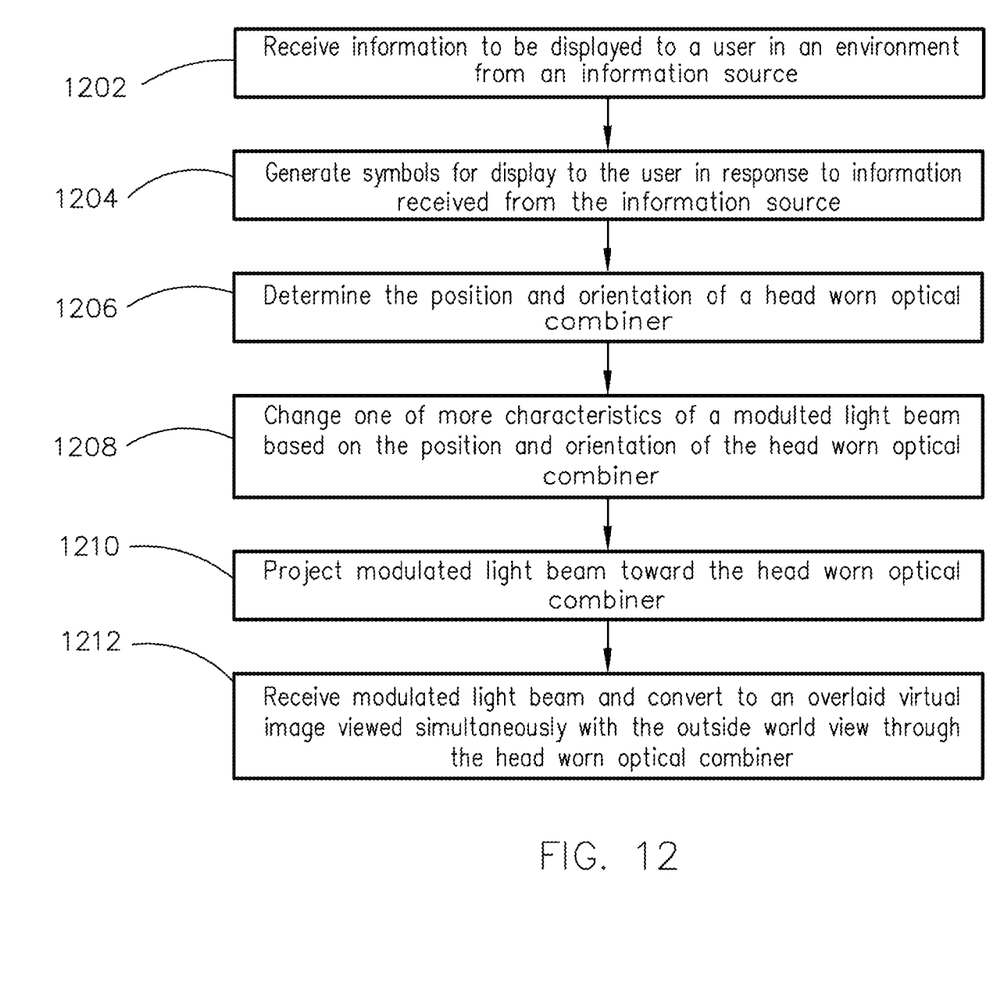
FIG. 12 is a diagram of an exemplary embodiment of a method for a free-space projected information viewing system for providing visual information to an individual user according to the inventive concepts disclosed herein.

Referring now to FIG. 12, an exemplary embodiment of a method according to the inventive concepts disclosed herein may include one or more of the following steps. It is to be understood that embodiments of methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A step 1202 may include receiving information to be displayed to a user in an environment from an information source.

A step 1204 may include generating symbols for display to the user in response to information received from the information source.

A step 1206 may include determining the position and orientation of a head worn optical combiner.

A step 1208 may include changing one or more characteristics of a modulated light beam based on the position and orientation of the head worn optical combiner.

A step 1210 may include projecting the modulated light beam toward the head worn optical combiner.

A step 1212 may include receiving the modulated light beam and converting it to an overlaid virtual image viewed simultaneously with the outside world view through the head worn optical combiner.

As will be appreciated from the above, head worn displays for display of information to a user according to embodiments of the inventive concepts disclosed herein are small, inexpensive, and reliable.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A device for presentation of visual information to a user, comprising:
   an image generator operatively coupled to an information source and configured to generate at least one image;
   at least one projector operatively coupled to the image generator and configured to generate light indicative of the at least one image and project the light indicative of the at least one image within a defined head box region such that a transparent optical combiner of a head worn viewing device positioned in the head box region receives and converts the light indicative of the at least one image into a final image viewable by the user, the final image being different from the at least one image, the head worn viewing device comprising the transparent optical combiner, wherein the at least one projector is positioned remotely from the head worn viewing device and is further configured to project the light indicative of the at least one image toward the head worn viewing device positioned in the head box region; and
   at least one of a head tracker or a camera configured to detect a position and an orientation of the head worn viewing device,
   wherein the image generator is configured to control the direction of the light indicative of the image toward the transparent optical combiner based on the position and the orientation of the head worn viewing device,
   wherein the image generator is configured to change the light indicative of the image depending on changes of the position and the orientation of the head worn viewing device in the head box region relative to the at least one projector,
   wherein the changes to the light indicative of the image include at least one of: horizontal scaling, vertical scaling, keystone distortion, barrel distortion, and cushion distortion,
   wherein the at least one projector comprises two or more projectors configured with overlapping head box regions,
   wherein the direction of the light indicative of the image is determined by the camera.

2. The device of claim 1, wherein the head worn viewing device includes the head tracker.

3. A system for presentation of visual information to a user in an aircraft, comprising:
   an image generator operatively coupled to an information source and configured to generate at least one image;
   at least one projector operatively coupled to the image generator and configured to project light indicative of the at least one image within a defined region of space comprising a head box;
   a head worn viewing device comprising an optical combiner configured to receive the light indicative of the at least one image when the optical combiner is positioned in the head box and to convert the light indicative of the at least one image into a final image viewable by the user, the final image being different from the at least one image,
   wherein the at least one projector is positioned remotely from the head worn viewing device and is further configured to project the light indicative of the at least one image toward the head worn viewing device positioned in the head box; and
   at least one of a head tracker or a camera configured to detect a position and an orientation of the head worn viewing device,
   wherein the image generator is configured to control the direction of the light indicative of the image toward the transparent optical combiner based on the position and the orientation of the head worn viewing device,
   wherein the image generator is configured to change the light indicative of the image depending on changes of the position and the orientation of the head worn viewing device in the head box region relative to the at least one projector,
   wherein the changes to the light indicative of the image include at least one of: horizontal scaling, vertical scaling, keystone distortion, barrel distortion, and cushion distortion,
   wherein the at least one projector comprises two or more projectors configured with overlapping head box regions,
   wherein the direction of the light indicative of the image is determined by the camera.

4. The system of claim 3, wherein the optical combiner is transparent.

5. The system of claim 4, wherein the head worn viewing device includes the head tracker.

6. The device of claim 1, wherein the transparent optical combiner is an emissive combiner.

7. The device of claim 1, wherein the transparent optical combiner includes a quantum dot nano crystal layer.

8. The device of claim 1, wherein the at least one projector is implemented in an aircraft flight deck environment.

9. The device of claim 1, wherein no more than one of the two or more projectors actively projects the light indicative of the at least one image to the transparent optical combiner of the head worn viewing device at any given time.

* * * * *